(12) United States Patent
Mason et al.

(10) Patent No.: US 12,190,137 B2
(45) Date of Patent: Jan. 7, 2025

(54) ACCESSIBILITY CONTENT EDITING, CONTROL AND MANAGEMENT

(71) Applicant: UserWay Ltd., Even Yehuda (IL)

(72) Inventors: Allon Mason, Even Yehuda (IL);
Robert Karnovski, Abu Dhabi (AE);
Lionel Arie Wolberger, Jerusalem (IL);
Leonid Muzyka, Horokhiv (UA)

(73) Assignee: UserWay Ltd., Even Yehuda (IL)

( * ) Notice: Subject to any disclaimer, the term of this patent is extended or adjusted under 35 U.S.C. 154(b) by 0 days.

(21) Appl. No.: 18/202,311

(22) Filed: May 26, 2023

(65) Prior Publication Data
US 2023/0315498 A1 Oct. 5, 2023

Related U.S. Application Data

(63) Continuation of application No. 17/712,147, filed on Apr. 3, 2022, now Pat. No. 11,681,540.

(51) Int. Cl.
*G06F 9/451* (2018.01)

(52) U.S. Cl.
CPC .................................. *G06F 9/453* (2018.02)

(58) Field of Classification Search
CPC ...................................................... G06F 3/0482
See application file for complete search history.

(56) References Cited

U.S. PATENT DOCUMENTS

| | | | |
|---|---|---|---|
| 9,430,450 B1 * | 8/2016 | Blinn | G06F 9/451 |
| 11,178,267 B1 * | 11/2021 | Delaney | G06F 3/0481 |
| 11,363,030 B2 | 6/2022 | Prasad | |
| 2011/0074807 A1 | 3/2011 | Inada et al. | |
| 2017/0286130 A1 * | 10/2017 | Eska | G06F 9/451 |
| 2020/0334411 A1 * | 10/2020 | Patel | G06F 40/143 |
| 2022/0261139 A1 | 8/2022 | Phoutchanthavongsa et al. | |

OTHER PUBLICATIONS

Notice of Allowance Dated Feb. 8, 2023 from the US Patent and Trademark Office Re. U.S. Appl. No. 17/712,147. (8 pages).
Official Action Dated Oct. 26, 2022 from the US Patent and Trademark Office Re. U.S. Appl. No. 17/712,147. (25 pages).

* cited by examiner

*Primary Examiner* — Di Xiao

(57) ABSTRACT

Method, system and computer program product for accessibility content editing, control and management. Digital content container for receiving plurality of elements modifiable via an application programming interface exposed by content structure thereof, and being associated with accessibility output for presentation responsive to processing by an assistive tool, is obtained. Responsive to receiving input indicating user selection of an element, an accessibility content editing interface is provided for obtaining modified accessibility output. The application programming interface is employed to modify the element by injection thereto the modified accessibility output to cause, responsive to the element being processed by an assistive tool applied to the digital content container, presentation of the modified accessibility output in substitution of the accessibility output associated with the element. Modified accessibility output from plurality of users is transmitted to data storage for recordation and review, for accessibility output sharing and/or predictive modelling purposes.

9 Claims, 6 Drawing Sheets

ACCESSIBILITY CONTENT EDITING, CONTROL AND MANAGEMENT

RELATED APPLICATION

This application is a continuation of U.S. patent application Ser. No. 17/712,147 filed on Apr. 3, 2022. The contents of the above application are all incorporated by reference as if fully set forth herein in its entirety.

FIELD AND BACKGROUND OF THE INVENTION

Some embodiments described in the present disclosure relate to user experience design and, more specifically, but not exclusively, to accessibility content editing, control and management.

With the advent of telecommunications networks and computing devices proliferation and ubiquity, the volume and extent of digital content consumer base and correspondingly its diversity level are in constant growth, giving rise to various demands and sometimes even legal obligations for inclusion and catering to particular needs of as many distinct user populations and/or usage profile types as possible.

One prominent example of such population of users attracting special attention and treatment is that of persons with disabilities, such as for example, visually- and/or motor-impaired individuals. The term "accessibility" often used in this context refers to the ability of disabled people to use a product or service as effectively as ones without a disability.

In the context of digital content, such as for example, content delivered over the worldwide web via communication channel(s) such as the Internet and/or the like, assistive technologies and/or accessibility arrangements for users with disabilities may be utilized in order to render the content intelligible for such users.

One prevalent assistive technology or accessibility tool is a screen reader for use by visually impaired users, e.g., blind persons or individuals with poor vision. Screen readers are assistive technologies that attempt to convey to a user what people with typical eyesight see on a display, via non-visual means such as, for example, text-to-speech, sound icons, non-spoken audio feedback or a Braille device. Such technologies may operate by applying a wide variety of techniques that include, for example, interacting with dedicated accessibility APIs, using various operating system features (like inter-process communication and querying user interface properties), and employing hooks that intercept messages and/or events passed between software components.

SUMMARY OF THE INVENTION

It is an object of the present disclosure to describe a system and a method for accessibility content editing, control and management.

The foregoing and other objects are achieved by the features of the independent claims. Further implementation forms are apparent from the dependent claims, the description and the figures.

According to one aspect of some embodiments of the disclosed subject matter there is provided a method for providing a user interface for editing accessibility content, comprising: obtaining a digital content container configured for receiving a plurality of elements, wherein an element of the plurality of elements is associated with an accessibility output for presentation to a user responsive to the element being processed by an assistive tool applied to the digital content container, wherein the digital content container is associated with a content structure exposing an application programming interface enabling modification of the element; responsive to receiving from the user an input indicating selection of the element, providing the user with an accessibility content editing user interface for obtaining from the user a modified accessibility output; and employing the application programming interface for modifying the element, by which the modified accessibility output obtained from the user is injected to the element to cause, responsive to the element being processed by an assistive tool applied to the digital content container, presentation of the modified accessibility output to the user in substitution of the accessibility output associated with the element.

According to some embodiments of the disclosed subject matter, the method further comprising reproducing, for presentation to the user, the modified accessibility output using the assistive tool.

According to some embodiments of the disclosed subject matter, the method further comprising processing the element by the assistive tool prior to providing the user with the accessibility content editing user interface, whereby the accessibility output is presented to the user.

According to some embodiments of the disclosed subject matter, the method further comprising transmitting the modified accessibility output to a data store.

According to some embodiments of the disclosed subject matter, the method further comprising: responsive to obtaining the digital content container, retrieving from a data store for at least one element of the plurality of elements a stored modified accessibility output, and employing the application programming interface for modifying the at least one element, by which an accessibility output associated with a respective element of the at least one element is substituted by the stored modified accessibility output retrieved for the respective element from the data store.

According to some embodiments of the disclosed subject matter, the plurality of elements being configured to be displayed on-screen for being visually perceived and the accessibility output is of a type selected from the group consisting of: an audio output; and, a tactical output.

According to some embodiments of the disclosed subject matter, the accessibility content editing user interface is of a type selected from the group consisting of: a graphical user interface; a voice activated user interface.

According to some embodiments of the disclosed subject matter, the accessibility content editing user interface being configured to present the user at least one optional accessibility content modification applicable for the element.

According to another aspect of some embodiments of the disclosed subject matter there is provided a method for sharing accessibility content among a plurality of users, comprising: obtaining a digital content container configured for receiving a plurality of elements, wherein an element of the plurality of elements is associated with an accessibility output for presentation to a user responsive to the element being processed by an assistive tool applied to the digital content container, wherein the digital content container is associated with a content structure exposing an application programming interface enabling modification of the element; responsive to receiving from the user an input indicating selection of the element, providing the user with an accessibility content editing user interface for obtaining from the user a modified accessibility output, which modified accessibility output is indicated as a contributor content; transmitting the modified accessibility output indicated as a contributor content to a data store configured for allowing retrieval thereof for review by an administrator and recordation thereof responsive to approval by the administrator as stored modified accessibility output, wherein the data store is configured for returning thereof responsive to a request for retrieval of stored modified accessibility output for the digital content container, whereby enabling, responsive to the modified accessibility output being received from the data store at a device of at least one other user, employing the application programming interface for modifying the element, by which the modified accessibility output obtained from the data store is injected to the element to cause, responsive to the element being processed by an assistive tool applied to the digital content container, presentation of the modified accessibility output to the at least one other user in substitution of the accessibility output associated with the element.

According to some embodiments of the disclosed subject matter the method further comprising: responsive to obtaining the digital content container, retrieving from the data store for at least one element of the plurality of elements a stored modified accessibility output, and employing the application programming interface for modifying the at least one element, by which an accessibility output associated with a respective element of the at least one element is substituted by the stored modified accessibility output retrieved for the respective element from the data store.

According to yet another aspect of some embodiments of the disclosed subject matter there is provided a computer program product for providing a user interface for editing accessibility content, comprising: a non-transitory computer readable storage medium; and program instructions for executing, by a processor, a method comprising: obtaining a digital content container configured for receiving a plurality of elements, wherein an element of the plurality of elements is associated with an accessibility output for presentation to a user responsive to the element being processed by an assistive tool applied to the digital content container, wherein the digital content container is associated with a content structure exposing an application programming interface enabling modification of the element; responsive to receiving from the user an input indicating selection of the element, providing the user with an accessibility content editing user interface for obtaining from the user a modified accessibility output; and employing the application programming interface for modifying the element, by which the modified accessibility output obtained from the user is injected to the element to cause, responsive to the element being processed by an assistive tool applied to the digital content container, presentation of the modified accessibility output to the user in substitution of the accessibility output associated with the element.

According to yet another aspect of some embodiments of the disclosed subject matter there is provided a computer program product for sharing accessibility content among a plurality of users, comprising: a non-transitory computer readable storage medium; and program instructions for executing, by a processor, a method comprising: obtaining a digital content container configured for receiving a plurality of elements, wherein an element of the plurality of elements is associated with an accessibility output for presentation to a user responsive to the element being processed by an assistive tool applied to the digital content container, wherein the digital content container is associated with a content structure exposing an application programming interface enabling modification of the element; responsive to receiving from the user an input indicating selection of the element, providing the user with an accessibility content editing user interface for obtaining from the user a modified accessibility output, which modified accessibility output is indicated as a contributor content; transmitting the modified accessibility output indicated as a contributor content to a data store configured for allowing retrieval thereof for review by an administrator and recordation thereof responsive to approval by the administrator as stored modified accessibility output, wherein the data store is configured for returning thereof responsive to a request for retrieval of stored modified accessibility output for the digital content container, whereby enabling, responsive to the modified accessibility output being received from the data store at a device of at least one other user, employing the application programming interface for modifying the element, by which the modified accessibility output obtained from the data store is injected to the element to cause, responsive to the element being processed by an assistive tool applied to the digital content container, presentation of the modified accessibility output to the at least one other user in substitution of the accessibility output associated with the element.

According to yet another aspect of some embodiments of the disclosed subject matter there is provided a system for providing a user interface for editing accessibility content, comprising: a processing circuitry adapted to execute a code for performing a method comprising: obtaining a digital content container configured for receiving a plurality of elements, wherein an element of the plurality of elements is associated with an accessibility output for presentation to a user responsive to the element being processed by an assistive tool applied to the digital content container, wherein the digital content container is associated with a content structure exposing an application programming interface enabling modification of the element; responsive to receiving from the user an input indicating selection of the element, providing the user with an accessibility content editing user interface for obtaining from the user a modified accessibility output; and employing the application programming interface for modifying the element, by which the modified accessibility output obtained from the user is injected to the element to cause, responsive to the element being processed by an assistive tool applied to the digital content container, presentation of the modified accessibility output to the user in substitution of the accessibility output associated with the element.

According to yet another aspect of some embodiments of the disclosed subject matter there is provided a system for sharing accessibility content among a plurality of users, comprising: a processing circuitry adapted to execute a code for performing a method comprising: obtaining a digital content container configured for receiving a plurality of elements, wherein an element of the plurality of elements is associated with an accessibility output for presentation to a user responsive to the element being processed by an assistive tool applied to the digital content container, wherein the digital content container is associated with a content structure exposing an application programming interface enabling modification of the element; responsive to receiving from the user an input indicating selection of the element, providing the user with an accessibility content editing user interface for obtaining from the user a modified accessibility output, which modified accessibility output is indicated as a contributor content; transmitting the modified accessibility output indicated as a contributor content to a data store configured for allowing retrieval thereof for review by an administrator and recordation thereof responsive to approval by the administrator as stored modified accessibility output, wherein the data store is configured for returning thereof responsive to a request for retrieval of stored modified accessibility output for the digital content container, whereby enabling, responsive to the modified accessibility output being received from the data store at a device of at least one other user, employing the application programming interface for modifying the element, by which the modified accessibility output obtained from the data store is injected to the element to cause, responsive to the element being processed by an assistive tool applied to the digital content container, presentation of the modified accessibility output to the at least one other user in substitution of the accessibility output associated with the element.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DESCRIPTION OF SPECIFIC EMBODIMENTS OF THE INVENTION

Figure 1A:
FIG. 1A is a schematic illustration of an exemplary website page containing an interactive element.

Some embodiments described in the present disclosure relate to user experience design and, more specifically, but not exclusively, to accessibility content editing, control and management.

One technical challenge dealt with by the disclosed subject matter is to streamline processes of accessibility content generation, enhancement, and/or dissemination by and among users developing, consuming, contributing to and/or otherwise interacting with an accessibility layer of a software product and/or service, such as for example, a website, web application program, and/or any likewise digital content source(s), as may be made available online.

Another technical challenge dealt with by the disclosed subject matter is to provide a user experience in a context of editing accessibility content for blind and/or visually impaired users which is similar to and/or approximating that of WYSIWYG (What You See Is What You Get) editors as may be used for editing, reviewing, and/or otherwise processing of visual content.

Digital content products and/or services such as websites, application software, computing platforms, and/or the like, generally rely on presentation of visually perceived content to their end-users. Blind and/or visually impaired users of digital content sources of this sort such as content streams originating from websites and/or the like may rely, for example, on aural presentation of content via assistive technologies such as screen readers and/or the like. These technologies may rely on both semantic Hyper-Text Markup Language (HTML) markup and special markup such as Web Accessibility Initiative-Accessible Rich Internet Applications (WAI-ARIA, or ARIA in short) labels in a respective accessibility layer. In general, an overwhelmingly large number of websites and likewise online digital content sources may be providing poor and/or unsatisfactory aural experience to end-users. Blind users in particular may suffer regularly from a poor user experience due to, inter alia, confusing screen reader feedback, poorly designed and/or unlabeled forms, poorly labeled images, lack of contextual information, lack of adequate attention to the auditory experience, and/or any likewise shortcomings and/or deficits, possibly arising from one or more of multiple reasons and origins.

Designers, programmers, and testers of software products and/or services, websites, and/or likewise digital content may generally focus overwhelmingly on a visual state of the content. WYSIWYG editors may greatly speed a process of iterative improvement, as a content author and/or software designer may experience visually, nearly immediately, the visual design for flat screen, printed page, 3D display or other rendering obtained as result, and can evaluate it visually quickly, at a glance. Programmers may see their requirements and expectations, and accordingly may match it visually to the design. Testers likewise may find it easy to validate the results. Many stakeholders may thus be easily involved, without any need for additional training or additional rendering steps, bringing diverse opinions to bear. When a user makes changes to the visual appearance of the content, e.g., changes the font of a text and/or the like, the WYSIWYG editor in response makes the appropriate changes at the code level to enable the new and changed visual appearance.

On the other hand, an accessibility layer such as an aural experience may not be so easy to design. Content authors may be required to author content that is to be read by a screen reader, yet they may have no immediate way to "hear" their content. Designers may be required to specify content that is to be read by a screen reader, yet they may have no immediate way to "hear" their designs. Programmers may need to modulate settings on a variety of software control elements, such as HTML elements and attributes. Testers may need to validate that an experience of consuming the digital content at hand, e.g., browsing and using a website under test, by means of an assistive technology alone, is adequate. These tools may be complex and require training, sharply limiting an ability of diverse stakeholders to experience in and bring their diverse opinions on the digital content to bear. WYSIWYG editors fail to reduce the friction around the audio experience. Such editors do not reproduce the auditory experience, and do not offer control over the programmatic code that creates the auditory experience. Requiring assistive technologies to be installed at content authors', designers', programmers', developers' and testers' stations also does not reproduce the simple experience of WYSIWYG, as the technologies are complex, require training, and read the entire page as it becomes available via accessibility APIs or hooks, and thus are not optimized to read a single element on a page while it is being edited.

In some embodiments, a plurality of visual elements in a digital content container may be modelled as objects, that may be accessed and modified via an Application Programming Interface (API), such as may be provided by a suitable content structure associated with the digital content container. A user interface configured for receiving from a user an input of an edit to an accessibility content associated with an element of the plurality of visual elements may be provided, optionally in response to selection of the element by the user. The element selected may be modified using the API so that the edit received as input from the user may be injected into the element in substitution of a pre-existing element and/or its corresponding accessibility layer portion, thereby causing the edited accessibility content to be presented to the user by an assistive tool applied to the digital content container or a portion thereof. Optionally the user may be able to experience such presentation of the edited accessibility content via the assistive tool instantaneously and/or as soon as the content edit is completed and effected upon the element by modification thereof via the API as described herein.

In some embodiments, the edited accessibility content may be transferred to and recorded in a suitable data store, such as for example, a software development system, a code repository, a backend database server, and/or the like. Optionally in response to a request for accessing and/or loading the digital content container, the data store may be queried for corresponding recorded edits stored therein and the edits may be retrieved therefrom and returned to an originator of the request. The retrieved edits may then be injected into respective elements from the plurality of visual elements using the API so as to replace former elements and/or their accessibility contents associated therewith and cause thereby to the respective modified accessibility layer be presented to the user in response to the digital content container and/or respective elements therein being processed by an assistive tool, in a same manner as may be done with an edit received as user input, as described herein.

In some embodiments, edits to accessibility contents of one or more elements of the plurality of visual elements in the digital content container may be proposed by one or more users. The proposed edits may be received locally at a user device via the user interface as input from a respective user of the one or more users and relayed to the data store as user contributed suggested content. A special user with appropriate privileges, such as an administrator, a superuser, and/or the like, may review the edits proposed by other users and accept or reject an edit proposal at discretion. Optionally accepted edit proposals may be committed to the data store as binding and may be provided on demand, such as in response to an access request to the digital content container, so as to allow injection thereof into respective elements using the API for modifying the respective accessibility contents thereof accordingly, as described herein.

In some exemplary embodiments, snapshots and/or likewise documentation capturing a state of the digital content container and/or of modified elements thereof immediately before and after an accessibility content edit may be recorded in the data store and provided as a training dataset to a supervised machine learning (ML) algorithm and/or artificial intelligence (AI) model. The trained model may then be applied to additional sources and/or documents containing digital content for automatically generating predictions of accessibility layer edits in improvement of the user experience of consumers of the content via an assistive tool. The edit predictions from the model may be reviewed and approved or rejected by a human user in charge, similarly as with suggestions from other human users, as described herein. Optionally the decisions of the user in adoption or discarding of a suggested edit by the model and/or another user may be used for additional tuning and/or training of the model.

One technical effect of utilizing the disclosed subject matter is to define an ability to design, program and evaluate an accessibility layer of a digital content such as an aural user experience and/or the like, with the immediacy and ease of the WYSIWYG experience. Stakeholders such as content authors, designers, programmers, testers, and/or the like may be able to aurally experience an entire web page, a part of a page or a single interactive component on the page, optionally while using standard navigation interfaces (e.g., pointer, navigation keys, and/or the like). When a change may be desired for a particular interactive element, an ability to make that change may be provided, such as for example while a navigator may be positioned at that interactive element. The change may be recorded as needed in a respective software development system and code repository, similarly as described herein. Users can experience the change, as an aural experience for example, as soon as the change may be completed.

As a person skilled in the art may readily appreciate, the simplified and immediate access as provided by utilizing the disclosed subject matter may enable many diverse stakeholders to experience the page and changes on the page as well, and their feedback can be fed back to previous links on the supply chain, e.g., the content author, designer and/or the like. In effect, users utilizing the disclosed subject matter may be provided with and take advantage of a What You Hear Is What You Get (WYHIWYG) immediate and low friction editing and content creation experience, regarding a text-to-speech audio assisted web page experience and/or any likewise accessible representation of the content, such as What You Feel Is What You Get (WYFIWYG) frictionless editing experience focused on the accessible content that may be conveyed for example by tactile interfaces (e.g., electronic Braille devices and/or the like).

It will be appreciated that the disclosed subject matter may provide an ability to create, read, update and/or delete software fields relating to the accessibility layer in general and the heard experience in particular, by supporting user reliance on audio for editing and validation of that editing.

It will further be appreciated that the disclosed subject matter may lend itself easily and conveniently to relying on crowd-sourcing for introduction of audio fixes in whole or in part and additionally or alternatively may take advantage of sophisticated tools such as AI and ML by training a model using supervised learning on a dataset of stored pre-fix and post-fix states.

An exemplary programming interface that may be utilized for carrying out some embodiments of the disclosed subject matter is the API standard known as Document Object Model (DOM), which is a cross-platform and language-independent interface for accessing and manipulating Extensible Markup Language (XML) and HTML documents, developed and maintained by the World Wide Web Consortium (W3C) and Web Hypertext Application Technology Working Group (WHATWG) organizations. The DOM connects HTML and/or XML documents such as, for example, web pages and/or the like to scripts and/or programming languages by representing the structure of the document in memory as a logical tree, wherein each branch of the tree ends in a node, and each node contains one or more objects. DOM methods allow programmatic access to the tree, such that the document's structure, style, content, and/or the like can be changed dynamically. With the DOM, programmers can create and build documents, navigate their structure, and add, modify, or delete elements and content thereof.

For example, in case of a web page composed as an HTML document, an application program such as a web browser and/or the like that may be used to render the document, may employ for that purpose an implementation of DOM or a likewise internal model similar thereto. When a web page is loaded, the web browser may create a DOM representation of the underlying HTML document which may act as an interface to the document and be harnessed by scripting languages such as JavaScript, Python, and/or the like for dynamic changing of the web page and/or its content, e.g., add, change, and remove any of the HTML elements and attributes, change any of the Cascading Style Sheets (CSS) style, react to any and/or all of the existing events, create new events, and/or the like.

For the sake of convenience and ease of understanding, the disclosed subject matter in some embodiments thereof is described and illustrated herein with a focus on digital content of web pages and/or web application programs specifically, however it is not limited in such manner and may be utilized in any other likewise contexts of digital content renditions, as can be readily apparent to a person skilled in the art.

Similarly, while some embodiments of the disclosed subject matter are described and illustrated herein out of convenience and for simplicity purposes with reference to usage of screen readers as one common assistive technology for making visual content accessible for low-vision and/or blind users, such depictions are not meant to be limiting in scope and any other appropriate assistive technologies and/or tools may be employed as well, as a person skilled in the art would readily appreciate.

Throughout the present disclosure, the terms "edit(s)", "modification(s)", "change(s)", "remediation(s)", "fix(es)", and/or the like may be used interchangeably to describe any alternates, enhancements, corrections, and/or the like made or to be made in connection with contents of an accessibility layer associated with digital content and/or any portion(s) thereof, and visual portion(s) in particular.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A which is a schematic illustration of an exemplary website page containing an interactive element.

As shown in FIG. 1A, a website page such as 100 may be rendered on a screen of a computing device, using for example a web browser such as 102. The website page 100 may comprise an inaccessible interactive element such as 110, comprising text that reads "Click here to complete registration" and a clickable link that encompasses a prefix portion of the text, i.e. "Click here". The inaccessible interactive element 110 may be rendered by an assistive technology (e.g., a screen reader) as "Click here, link", thus without additional details, such as contextual and/or likewise information being made available the link may not be sufficiently informative to a user relying on the assistive technology.

Figure 1B:
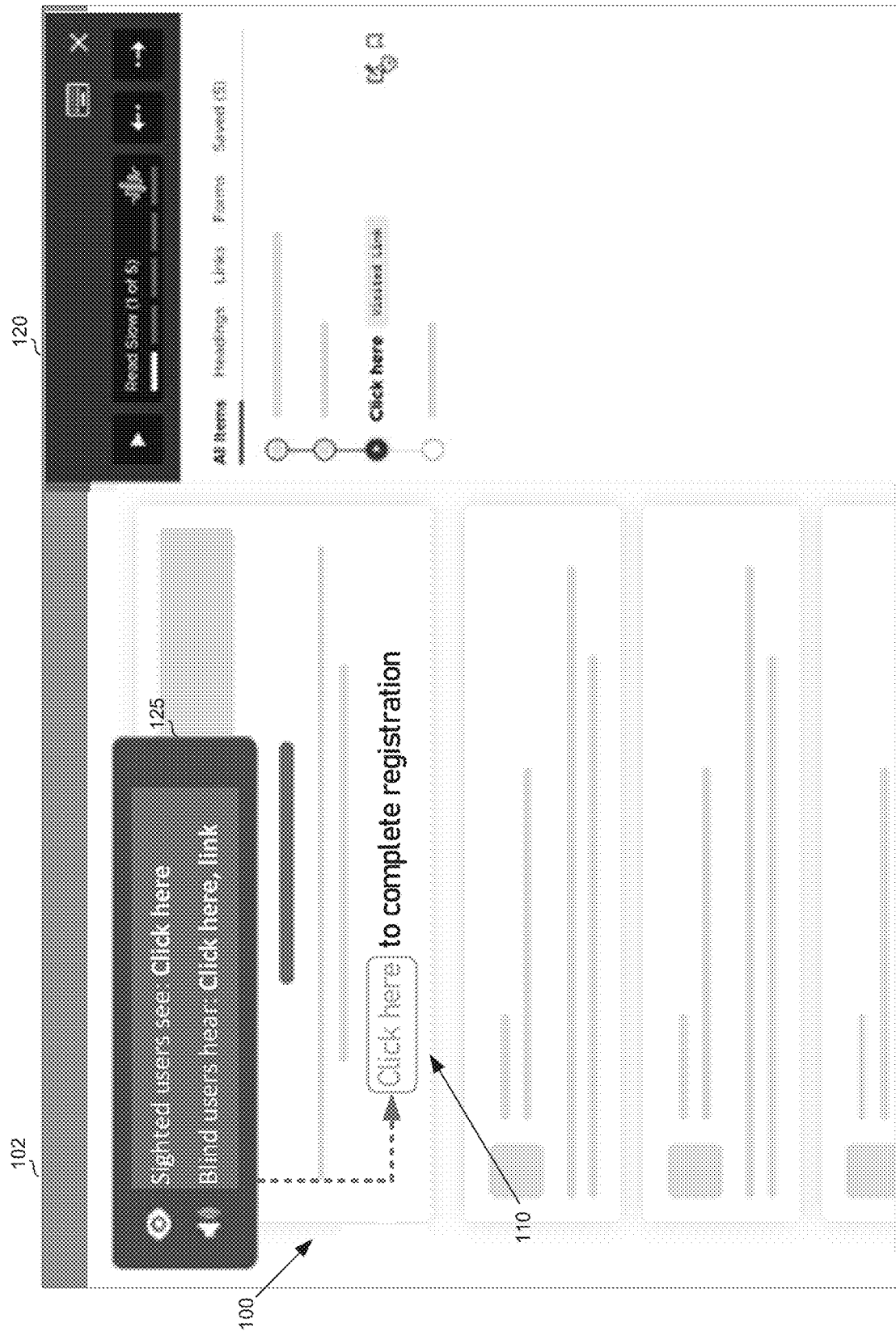
FIG. 1B is a schematic illustration of an exemplary website page containing an interactive element reviewed using an accessibility content editor.

Reference is now made to FIG. 1B which is a schematic illustration of an exemplary website page containing an interactive element reviewed using an accessibility content editor.

As shown in FIG. 1B, a user interface of an accessibility content editor such as 120 may be provided, for example by displaying thereof on the screen of the computing device on which the web browser 102 is used for displaying the website page 100 containing the inaccessible interactive element 110. The user interface 120 may be displayed for example as an overlay on top of the web browser 102 and/or website page 100, alongside thereof, and/or the like. The accessibility content editor and user interface 120 thereof may be used for reviewing and/or editing an auditory experience and/or the like of the website page 100. Optionally the accessibility content editor may be a software widget, such as a web, desktop, and/or mobile widget and/or the like that may be executed by a suitable widget engine such as for example a web browser and/or the like.

The interactive element 110 may be selected by a user for examination thereof, for example by pointing and clicking on the interactive element 110 using a pointing device and/or the like. Optionally, descriptive information such as 125 may be provided to assist the user editing the interactive element 110, for example, as illustrated in FIG. 1B, the descriptive information 125 may be displayed on-screen, e.g., proximally to interactive element 110, and may read for example, "Sighted users see Click here. Blind users hear click here, link."

In response to selection thereof by the user, the interactive element 110 under review may be retrieved and/or otherwise accessed by the accessibility content editor and accordingly indicated as such in the user interface 120. Optionally the user interface 120 may show the interactive element 110 as one of a list of all interactive elements on the page 100. In case user interface 120 is of an auditory experience editor, the user interface 120 may read the interactive element 110 to the user, for example "Click here visited link." Optionally the phrase "visited link" may be rendered by user interface 120 in another color, as it may be added by screen readers and/or likewise assistive technology due to the semantic link, even though these words may not be present in the content on the page 100. Optionally, the user interface 120 may display the HTML, ARIA, XML, CSS, and/or any other likewise programmatic settings that define the rendering of interactive element 110.

Figure 1C:
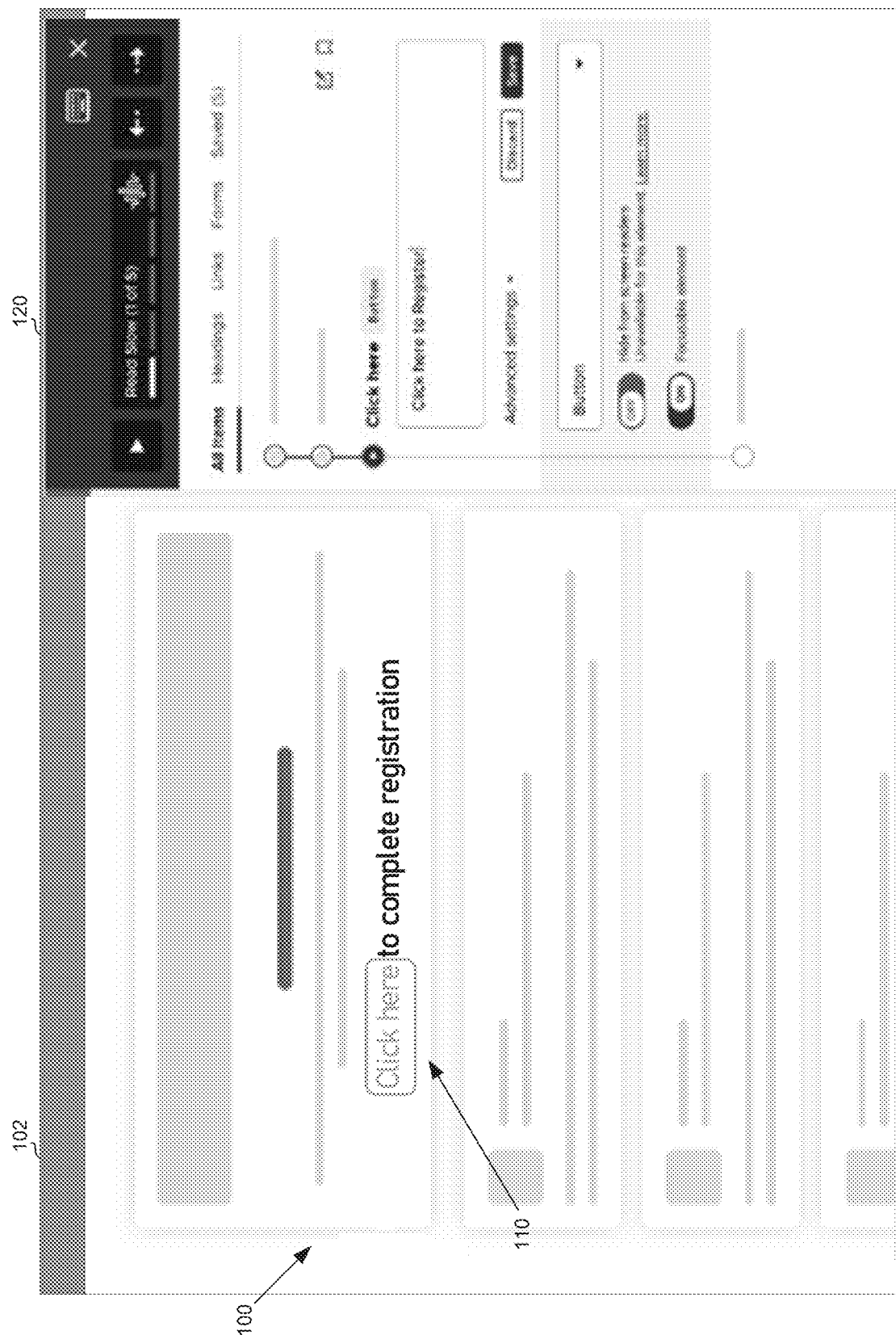
FIG. 1C is a schematic illustration of an exemplary website page containing an interactive element edited using an accessibility content editor.

Reference is now made to FIG. 1C which is a schematic illustration of an exemplary website page containing an interactive element edited using an accessibility content editor.

The user may opt to change an accessibility content associated with the interactive element 110, e.g., providing an alternate audio announcement for presentation screen readers and/or likewise accessible experience for assistive tools, for example by clicking "edit" in the user interface 120 while the interactive element 110 is under review, similarly as depicted herein with reference to FIG. 1B. In response, the accessibility content editor and user interface 120 thereof may enter edit mode, and provide the user with an opened dialog box, a prompt, and/or the like for receiving input therefrom. The user may enter a fix into the dialog box, such as for example "Click here to Register." Optionally as illustrated in FIG. 1C, the user interface 120 may comprise a semantic selector dropdown that may have an option "Button" selected, a "Hide from screen readers" button which may be off, a "Focusable element" button which may be on, and/or the like. Optionally the user interface 120 may offer the ability to select the experience being edited, whether it being an announcement by a screen reader, Braille rendering by a Braille device, and/or any other likewise accessible experience that may enabled by assistive technology and associated programmatic markup languages.

The user may click "save" in the user interface 120 of the accessibility content editor to save changes made to the interactive element 110 and intended for an assistive technology applied to an accessibility layer of the website page 100, such as a screen reader and/or the like, and optionally thereby confirm that the interactive element 110 is now accessible for disabled users, such as for example visually impaired users and/or users relying on assistive technology of the sort.

Figure 2:
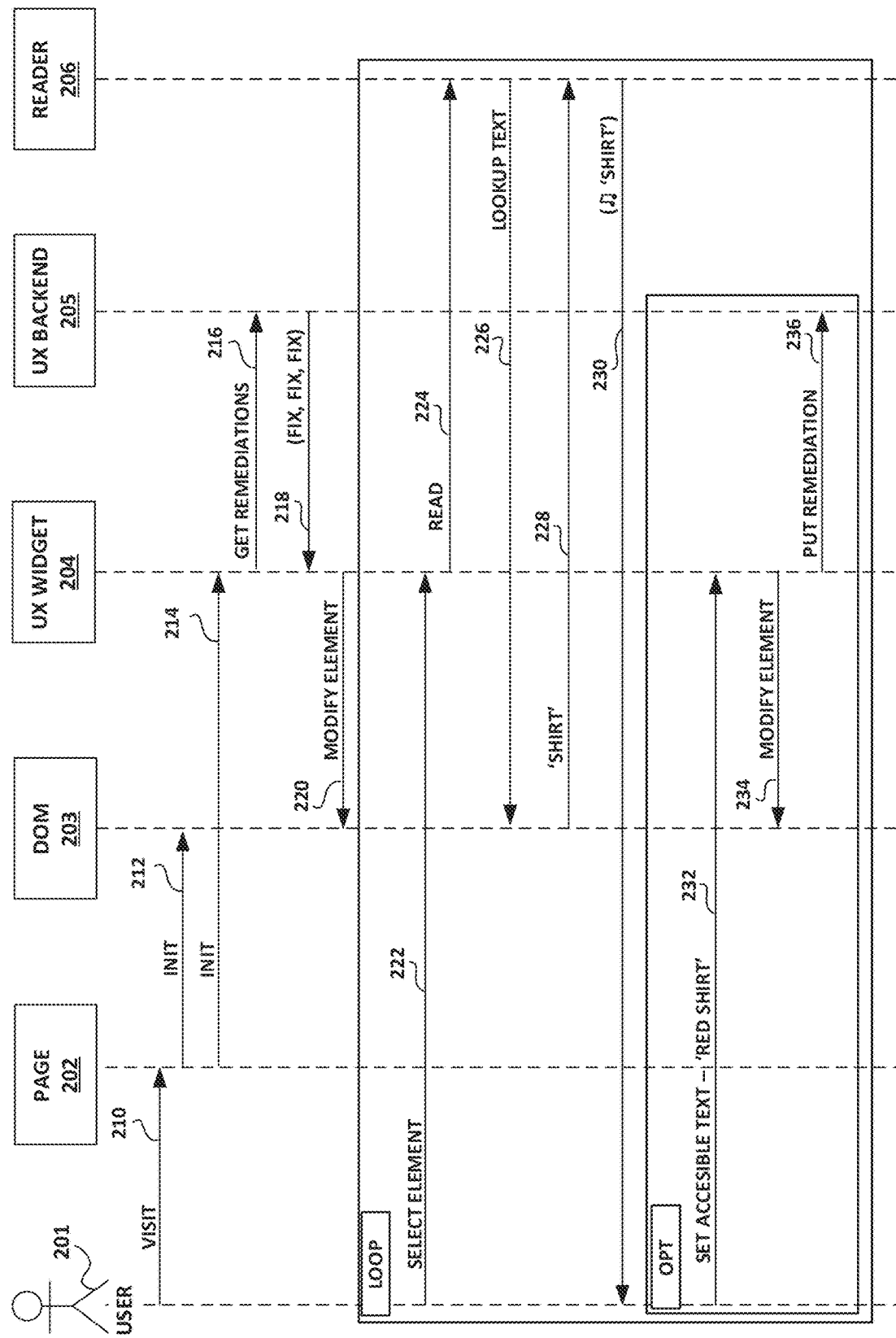
FIG. 2 is a sequence diagram of an optional flow of operations for providing an accessibility content editing user interface.

Reference is now made to FIG. 2 which is a sequence diagram of an optional flow of operations for providing an accessibility content editing user interface.

A user such as 201 may visit at 210 a website page such as 202. At 212, upon loading of the page 202 by a web content rendering program such as a web browser, a corresponding content structure, programmatic encoding and API such as a document object model (DOM) 203 may be initiated. At 214, a user experience (UX) editor, such as UX widget 204, configured for allowing user 201 to review and/or edit an accessibility layer of page 202 may be initiated too. At 216, the UX widget 204 may issue a request to get remediations for the accessibility layer of page 202 from a corresponding networked service of UX widget 204 such as UX backend 205. At 218, the UX backend server 205 may return a set of fixes in response. At 220, the UX widget 204 may apply each received fix to the accessibility layer of page 202 by modifying a respective element in the page 202 using the API of the DOM 203.

At 222, the user 201 may select an element in the page 202, which selection may be communicated to the UX widget 204. At 224, the UX widget 204 may request an assistive technology such as reader 206 to render the element selected by the user 201 (in the case of a screen reader, the screen reader may announce the element). At 226, the reader 206 may look up a text and/or likewise user experience for the selected element in the accessibility layer of page 202 by invoking the DOM 203 for querying for an accessibility content of that element. At 228, a corresponding text may be returned in response, e.g., 'shirt' as in the illustrative example depicted in FIG. 2. At 230, the reader 206 may announce the returned content to the user 201. The procedure carried out at 222 through 230 may be performed repeatedly for any number of times.

At 232, the user 201 may use the UX widget 204 to edit the accessibility content of the element selected at 222, e.g., set the accessible text thereof to 'red shirt', as in the illustrative example depicted in FIG. 2. At 234, the UX widget 204 may modify the element using the API of the DOM 203, similarly as may be done at 220. At 236, the UX widget may transfer to the UX backend 205 the edited accessibility content for storage with pre-existing remediations such as returned at 218, using a put remediation command for example. The procedure carried out at 232 through 236 may be optional and applied to any element and/or combination of elements in the page 202, as well as to none thereof.

In some embodiments, modifying the element may entail locating all attributes, tags end values and/or identifying all markup fields that may be relevant to the accessibility layer and which contents thereof may be required to be updated. The accessibility editor may have an extensible dictionary of program instructions that enable it to locate the program instructions most related to the element selected for editing. Program instructions may take the form of attributes, tags, values and/or identifying markup fields written in HTML, XML, Resource Description Framework (RDF), CSS, JavaScript, and/or any likewise other languages. Isolating the element's program instructions may be a prerequisite to deploying edits to the element.

In some embodiments, modifying the element may entail a capability of deploying new computer readable program instructions to cause the edited text to be rendered by the assistive technology, e.g. announced by the screen reader and/or the like. To deploy an edit, the accessibility editor may rely on one or more prediction models that predict how to edit the program instructions to implement the edited change. A decision-making mechanism may accept multiple deployment predictions, then deploy the prediction with a highest confidence value. One exemplary prediction may rely on the context of the element's isolated code. A dictionary of markup changes based on context may be used, and each context may be related to a predicted markup. For example, an image may have its screen reader announcement edited by modifying the 'alt' attribute. A more complex prediction may rely on an AI model prediction based on past behavior, for example. In some embodiments, there may be as many thousands of examples of people deploying edits. These edits may serve as a supervised training model for an AI or ML system. The AI/ML system can then predict changes for previously unseen code examples. More complex predictions rely on visually interpreted code. Such predictive models may inspect the visual element and associate this visual appearance with deployed edits. These edits may serve as a supervised training model for an AI or ML system. The system can then predict changes for previously unseen code examples.

In some embodiments, decisions regarding the accessibility experience may be presented to the user for wizard-like deployment. For example, a checkbox may be presented where the user may check that an image is merely decorative (meaning that it need not be announced by a screen reader).

Figure 3:
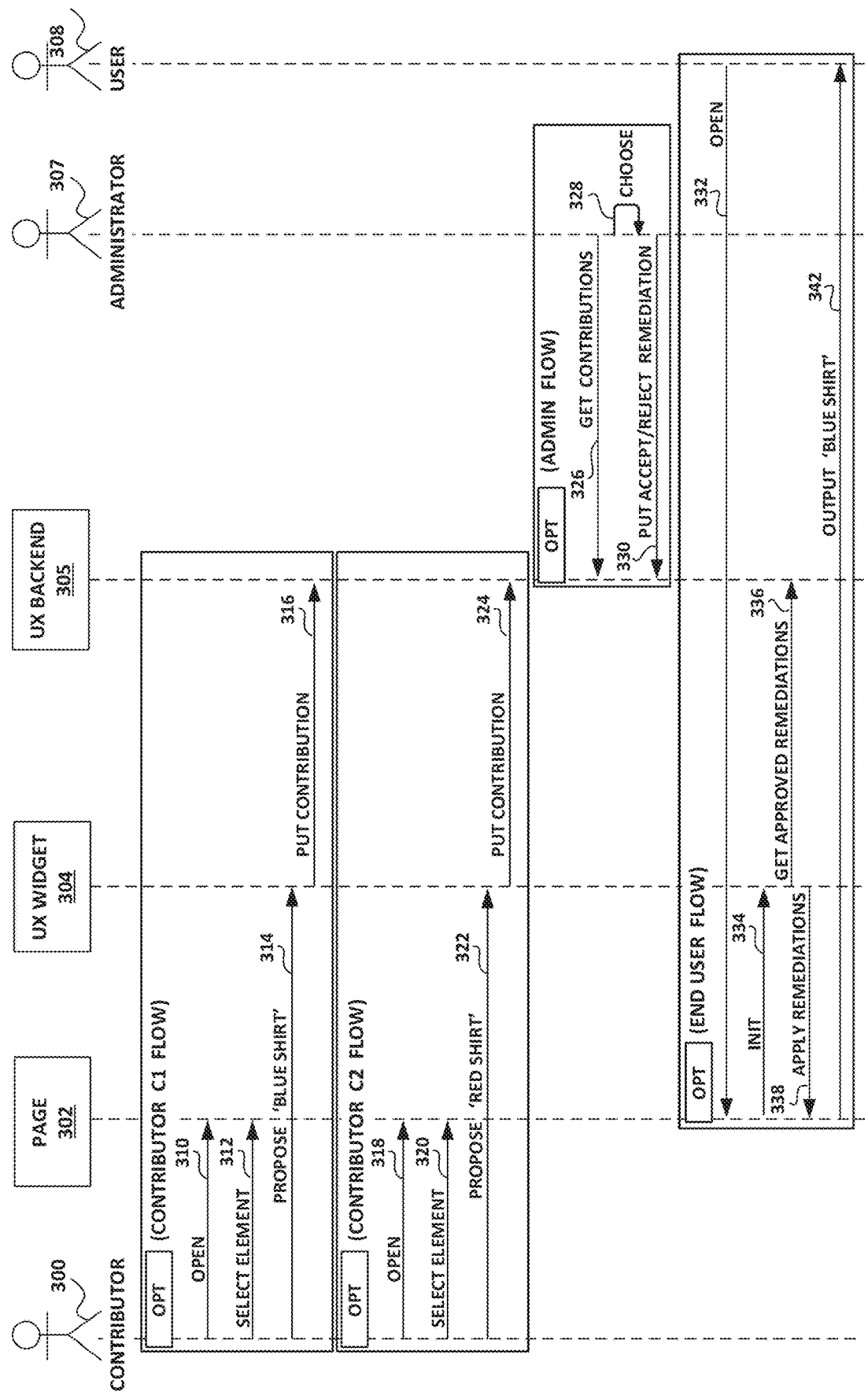
FIG. 3 is a sequence diagram of an optional flow of operations for accessibility content editing, control and management.

Reference is now made to FIG. 3 which is a sequence diagram of an optional flow of operations for accessibility content editing, control and management.

At 310, a contributor such as 300 may open a web page such as 302. At 312, the contributor may select an element in the page 302. At 314, the contributor 300 may input a proposed edit to an accessibility content of the element selected, e.g., set a text thereof to 'red shirt', using a client program such as UX widget 304. At 316, the UX widget 304 may transfer the contributed edit to a server such as UX backend 305. Similarly, at 318, another contributor such as 300 may open the page 302. At 320, the other contributor may select the element, and at 322, use UX widget 304 to input a different proposed edit to the content, e.g., set the text to 'blue shirt'. At 324, the UX widget 304 may transfer the additional contributed edit to the UX backend 305 too.

At 326, an administrator such as 307 may access the UX backend 305 to get therefrom contributions of accessibility content edits as provided by one or more of the contributor (s) 300. At 328, the administrator 307 may choose which of the contributions in the UX backend 305 to accept and which to reject. At 330, the administrator 307 may put in the UX backend 305 the remediations with each of which being flagged either as approved or rejected, as applicable.

At 332, a user such as 308 may open the page 302. At 334, the UX widget 304 may be initiated responsive to the page 302 loading. At 336, the UX widget 304 may get approved remediations from the UX backend 305. At 338, the remediations may be applied by the UX widget to the page 302, similarly as described herein.

Figure 4:
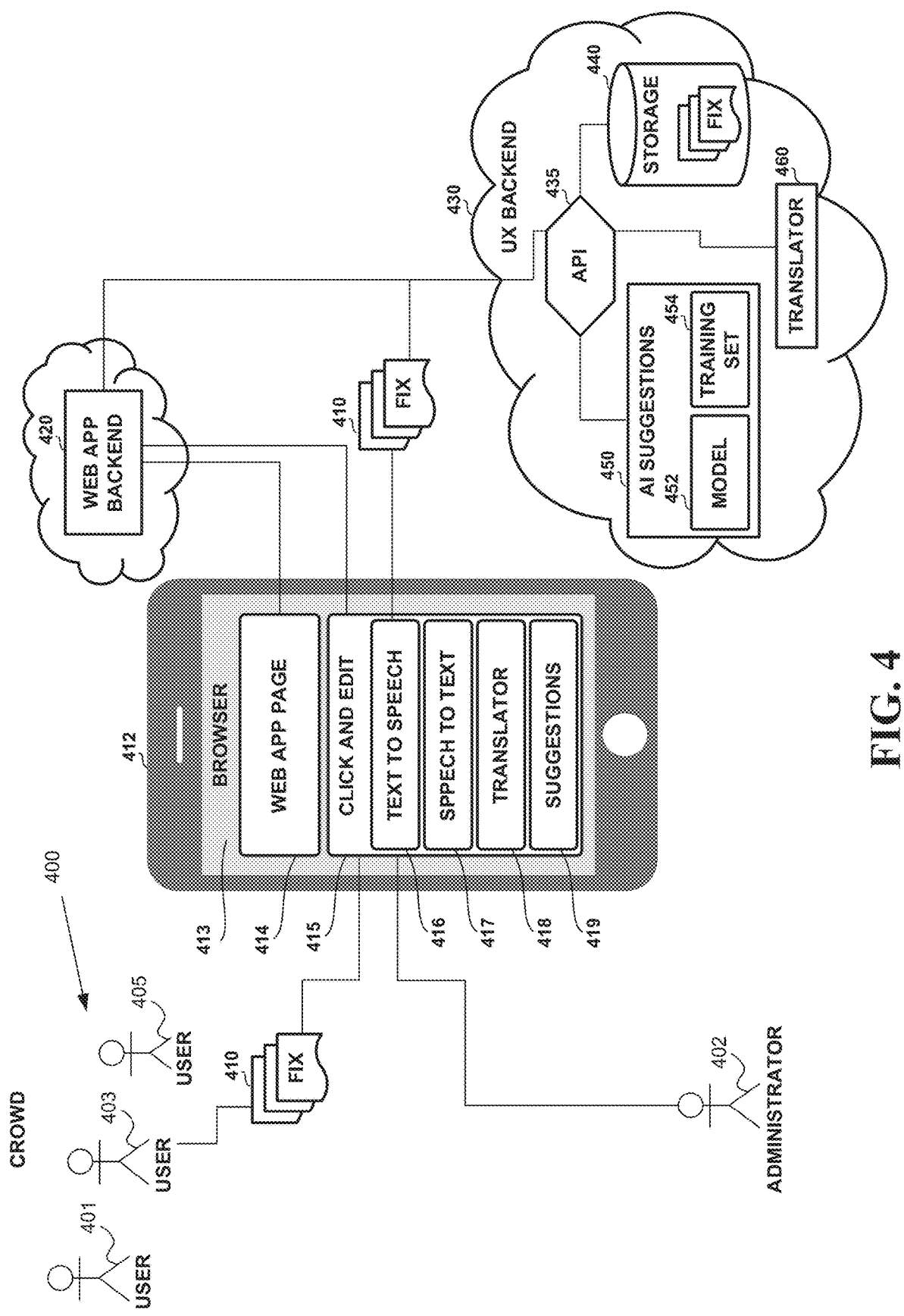
FIG. 4 is a schematic illustration of an exemplary network environment and architecture for accessibility content editing, control and management.

Reference is now made to FIG. 4 which is a schematic illustration of an exemplary network environment and architecture for accessibility content editing, control and management.

A plurality of users such as 401, 403, and 405, collectively denoted as crowd 400, may use a software application container, such as for example a web browser 413, configured for rendering content from a digital content service such as a web application program (app) backend 420. Each of the users in the crowd 400 may consume the digital content, experience its user interface, and/or suggest fix(es) 410 to that experience in order to improve it, similarly as described herein.

An administrator or admin user such as 402 may have same capabilities as users in the crowd 400. In addition, the admin user 402 may be authorized to approve changes, or fix(es) 410 recommendations that may accordingly become committed and change as a result the digital content from a pre-fixed version V1 to a fixed version V2. The administrator 402 may interact with a web application via a web app page 414, and may also issue commands to a networked service controlling and managing an accessible user experience of digital content such as UX backend 430.

The software application container such as the browser 413 may be configured to read digital content from the web app backend 420 and communicate it to an assistive technology, e.g. an audio processing engine, such as text-to-speech 416. Optionally the software application container may be a mobile application, a bytecode application that may run on a dedicated processor, and/or any likewise instantiation of an application container, such as for example the browser 413 as illustrated in FIG. 4. The application container 413 may also access its own local application data storage (not shown). The application container 413 may allow each of the users in the crowd 400 to experience the web app page 414 visually and/or aurally.

In some embodiments, a unit of auditory experience may be an interactive element such as for example a link, button, input field, text description, paragraph of text, and/or any combination of such interactive elements and/or the like. For example, the web app page 414 shown in FIG. 4 may be a unit of auditory experience.

In some embodiments, an editor for reviewing and/or editing accessibility content, such as the editor denoted in FIG. 4 as click-and-edit 415, may be provided for example via the application container 413. For a given unit of auditory experience, the editor click-and-edit 415 editor may be configured to isolate the unit of auditory experience, present an editing interface to a user such as the users 401, 402, 403, and/or 405, and accept a user input to edit that experience. The edit may be applied in the application container 413, updating a respective code in the web app page 414, optionally with concomitant changes to one or more other components comprised in and/or coupled to the application container 413 as described herein, to create new auditory experience. The fix(es) 410 may be packaged and transferred to the UX backend 430 and optionally to the web app backend 420 where applicable.

The application container 413 may comprise and/or be in communication with an assistive technology such as text to speech 416, configured to create for example an auditory experience and/or audio announcement of content or structure on a user interface, software, web app, and/or likewise digital content that may be found in the web app page 414.

Optionally the application container 413 may further comprise and/or be in communication with an assistive technology for auditory input of content such as speech to text 417 which may be configured to detect speech and translate that speech into symbols required by the web app page 414, web app backend 420, and/or any likewise other software components, as well as to record those symbols into fixes that, when read by the text to speech 416 output assistive technology, may re-create the input auditory experience.

Optionally the application container 413 may comprise and/or be in communication with a translator interface such as 418 which may be configured to access in the UX backend 430 a corresponding translator service 460 for translating into other languages an output of the text to speech 416 assistive technology and/or an input of the speech to text 417 assistive technology and/or of the click and edit 415 content editor.

Optionally the application container 413 may comprise and/or be in communication with a suggestions interface such as 419 of a corresponding service such as AI suggestions 450 in the UX backend 430 configured for making suggestions based on algorithmically generated predictions, related experiences, other fixes 410 suggested by other users as may be stored in storage 440, and/or the like as described herein.

In some embodiments, fix(es) 410 may be any modified and/or alternate experience such as a change request, change suggestion, alternate auditory experience, and/or the like. The fix(es) 410 may include for example any information that may be sufficient to define which interactive elements may be required to be changed on the web app page 414, a pre-existing code version prior to the change, an updated code version as may be obtained after the fix may be applied, and/or the like.

The UX backend 430 may be a backend server system configured for coordinating versions and changes to an accessibility layer of the web app page 414, such as for example a networked available service for delivering content, receiving fixes such as 410, making suggestions, and/or the like. Optionally UX backend 430 may further be configured for changing the accessibility content from version V1 to V2 when receiving an appropriate authorization to do so, from admin user 402 for example.

In some embodiments a service such as AI predictions 450 may be configured to predict version changes based for example on its respective model 452 and training set 454. The AI predictions 450 service may store changes made in the past, thereby forming a supervised learning training dataset, and generate AI or ML model(s) based on such training sets. Optionally these generated model(s) 452 may be applied to new and/or previously unseen interactive elements and thereby generate predicted fixes for approval by users such as admin user 402 and/or the like.

A translation service such as translator 460 may be configured to service a translator interface such as 418 and/or other services in UX backend 430. Translator 460 may be utilized to translate content from one or more languages to one or more other languages, so that audio content in language L1 may be presented for example in language L2, L3, etc.

A storage service such as 440 may be employed to store for example web content, fixes, user identities and authorizations, and/or otherwise persist any data needed by one or more software components of the UX backend 430 server and/or click and edit 415 editor.

The UX backend 430 may comprise an application programming interface and backend such as API 435 to enable communication between the one or more software components of the UX backend 430 and/or of the click and edit 415 editor. The API 435 may host and supply a software application which may deliver the user experience that may be subject to being fixed, such as the click and edit 415 editor for example.

For illustration purposes, an exemplary scenario detailing a manner in which the disclosed subject matter may be used in practice is described herein. In this exemplary scenario, web content may be available in a version "V1", with interactive elements "IE1", "IE2", etc., that may feature semantic content and/or markup specifically for an accessibility layer (e.g., WAI ARIA tags). Version "V1" may be made ready for access in a browser and by assistive technology, for example. A primary user or designer "U1" may experience "V1" via a screen reader or assistive technology. One announcement on "IE1" may seem to "U1" to need fixing to offer an improved user experience. "U1" may operate a 'hit to edit' interface of an accessibility content editor such as disclosed herein. The editor may mark the relevant code (semantic, WAI ARIA or otherwise) as being edited and open the edit user interface for "U1" to input their fix. "U1" may input a fix by any input provision means supported by the edit user interface (e.g., speaking it, typing it, uploading it, and/or the like). The fix may be applied to the relevant code that affects "IE1". "U1" may hit 'continue' and "U1" now experience a version "V2" that includes the fix. Version "V2" may also be shared with other users "U2", "U3" etc. who may offer fixes as well that can be reviewed by "U1".

It will be appreciated by a person skilled in the art that the disclosed subject matter is advantageous over other methods and systems available, by providing a vastly increased efficiency in improving the heard experience and/or likewise accessibility layer. Under pre-existing approaches, the programmatic elements that modify and inform operation and/or behavior of a screen reader and/or likewise assistive technology may be located in disparate locations, as singular attributes that might be buried in nonintuitive places in the code and/or document content structure, e.g. in the DOM tree and/or the like. By utilizing the disclosed subject matter all attributes, tags and values relevant to the accessibility layer may be located and a user may be allowed to edit them as if they are located in one virtual space. Greater simplicity in auditing, editing and improving the heard experience for example may thus be achieved, by an ability of the disclosed subject matter to identify the markup fields that generate the heard experience, as well as providing users with an ability to hear that experience immediately upon editing thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant accessibility content editing, control and management systems and methods will be developed and the scope of the term accessibility content editors is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for sharing accessibility content among a plurality of users, comprising:

obtaining a content structure associated with a digital content container configured for receiving a plurality of elements, wherein an element of the plurality of elements is associated with an accessibility output providing for presentation to a user of an accessible representation of the element via at least one differently perceived medium responsive to the element being processed by an assistive tool applied to the digital content container and configured for transforming digital content user experience into the at least one differently perceived medium, wherein the content structure exposing an application programming interface enabling modification of the element;

responsive to receiving from the user an input indicating selection of the element, providing the user with an accessibility content editing user interface for obtaining from the user a modified accessibility output providing for modifying the accessible representation of the element via the at least one differently perceived medium, which modified accessibility output is indicated as a contributor content;

transmitting the modified accessibility output indicated as a contributor content to a data store configured for allowing retrieval thereof for review by an administrator and recordation thereof responsive to approval by the administrator as stored modified accessibility output, wherein the data store is configured for returning thereof responsive to a request for retrieval of stored modified accessibility output for the digital content container, whereby enabling, responsive to the modified accessibility output being received from the data store at a device of at least one other user, employing the application programming interface for modifying the element, by which the modified accessibility output obtained from the data store is injected to the element to cause, responsive to the element being processed by the assistive tool, presentation to the at least one other user of the accessible representation of the element provided by the modified accessibility output in substitution of the accessible representation provided by the accessibility output associated with the element.

2. The method of claim 1, further comprising: responsive to obtaining the digital content container, retrieving from the data store for at least one element of the plurality of elements a stored modified accessibility output, and employing the application programming interface for modifying the at least one element, by which an accessibility output associated with a respective element of the at least one element is substituted by the stored modified accessibility output retrieved for the respective element from the data store.

3. A computer program product for sharing accessibility content among a plurality of users, comprising:

a non-transitory computer readable storage medium;

program instructions for executing, by a processor, the method of claim 1.

4. A system for sharing accessibility content among a plurality of users, comprising:

a processing circuitry adapted to execute a code for performing the method of claim 1.

5. The method of claim 1, further comprising reproducing, for presentation to the user, the accessible representation provided by the modified accessibility output using the assistive tool.

6. The method of claim 1, further comprising processing the element by the assistive tool prior to providing the user with the accessibility content editing user interface, whereby the accessible representation provided by the accessibility output is presented to the user.

7. The method of claim 1, wherein the plurality of elements being configured to be displayed on-screen for being visually perceived and the accessible representation provided by the accessibility output is of a type selected from the group consisting of: an audio output; and, a tactical output.

8. The method of claim 1, wherein the accessibility content editing user interface is of a type selected from the group consisting of: a graphical user interface; a voice activated user interface.

9. The method of claim 1, wherein the accessibility content editing user interface being configured to present the user at least one optional accessibility content modification applicable for the element.

* * * * *